United States Patent
Ionin et al.

(10) Patent No.: US 12,298,846 B2
(45) Date of Patent: May 13, 2025

(54) ENHANCED END TO END SYSTEM FAILURE RECOVERY

(71) Applicant: Western Digital Technologies, Inc., San Jose, CA (US)

(72) Inventors: Michael Ionin, Rehovot (IL); Alexander Bazarsky, Holon (IL); Judah Gamliel Hahn, Ofra (IL)

(73) Assignee: Sandisk Technologies, Inc., Milpitas, CA (US)

(*) Notice: Subject to any disclaimer, the term of this patent is extended or adjusted under 35 U.S.C. 154(b) by 0 days.

(21) Appl. No.: 18/219,815

(22) Filed: Jul. 10, 2023

(65) Prior Publication Data

US 2025/0021428 A1    Jan. 16, 2025

(51) Int. Cl.
*G06F 11/10* (2006.01)

(52) U.S. Cl.
CPC ...... *G06F 11/1004* (2013.01); *G06F 11/1068* (2013.01)

(58) Field of Classification Search
None
See application file for complete search history.

(56) References Cited

U.S. PATENT DOCUMENTS

| | | |
|---|---|---|
| 9,905,314 B2 | 2/2018 | Tuers et al. |
| 10,459,785 B2 | 10/2019 | Dusija et al. |
| 11,023,317 B2 | 6/2021 | Wiita et al. |
| 11,334,426 B2 | 5/2022 | Mai et al. |
| 2003/0095483 A1* | 5/2003 | Xiong ............ G11B 7/005 |
| 2011/0041031 A1 | 2/2011 | Ko et al. |
| 2016/0342462 A1* | 11/2016 | Karamanolis ...... G06F 3/0664 |
| 2016/0350001 A1 | 12/2016 | Kirazci et al. |
| 2020/0265137 A1 | 8/2020 | Yoon et al. |
| 2022/0107737 A1 | 4/2022 | Choi et al. |
| 2022/0138042 A1 | 5/2022 | Shaeffer et al. |
| 2022/0229725 A1* | 7/2022 | Kanter ............ H03M 13/09 |
| 2022/0382464 A1 | 12/2022 | Kim et al. |

FOREIGN PATENT DOCUMENTS

CN    114691417 A    7/2022

OTHER PUBLICATIONS

International Search Report and Written Opinion for Application No. PCT/US2024/029525 dated Aug. 30, 2024.

* cited by examiner

*Primary Examiner* — Guerrier Merant
(74) *Attorney, Agent, or Firm* — PATTERSON + SHERIDAN, LLP

(57) ABSTRACT

In order to guarantee data validity of data read from a memory device of the data storage device to a host device, a controller of the data storage device may calculate a cyclic redundancy code (CRC) signature of the decoded data and compare the CRC signature of the decoded data with a CRC signature of the data. The CRC signature of the data is generated during a write operation of the data to the memory device. Rather than returning an uncorrectable error correction code error (UECC) error to the host device when the CRC signature of the decoded data does not match the CRC signature of the data, the controller executes the read command again. By using a different buffer to store the decoded data, the controller may confirm whether the error stemmed from the read path or the error was not from the read path.

18 Claims, 7 Drawing Sheets

ENHANCED END TO END SYSTEM FAILURE RECOVERY

BACKGROUND OF THE DISCLOSURE

Field of the Disclosure

Embodiments of the present disclosure generally relate to data storage devices, such as solid state drives (SSDs), and, more specifically, improving end to end data protection.

Description of the Related Art

Data storage devices employ different data protection mechanisms in order to guarantee data integrity. In other words, data protection mechanisms are utilized to protect data that is being returned to a host device from integrity errors. A type of data protection mechanism is block level exclusive or (XOR) protection, which may be utilized with data that is expected to have a very low uncorrectable bit error rate (UBER). In order to further guarantee end to end protection of data, the data storage device may calculate a flash management unit (FMU) cyclic redundancy code (CRC) signature for host data being stored in the data storage device.

When reading the data stored in the data storage device, the FMU CRC signature is checked against a calculated FMU CRC signature, calculated at the time of the read operation, in order to detect any possible bit errors that the data may have accumulated during the read operation. When the FMU CRC signature does not match the calculated FMU CRC signature, an uncorrectable error correction code (UECC) error is returned to the host device without realizing the entire error correction code (ECC) decoding potential of the data storage device even when the original data read from the data storage device is valid. In other words, the point of error during the read operation may be localized to a portion of the data path of the read operation.

Thus, there is a need in the art for an improved read operation in order to improve end to end protection of data.

SUMMARY OF THE DISCLOSURE

The present disclosure generally relates to data storage devices, such as solid state drives (SSDs), and, more specifically, improving end to end data protection. In order to guarantee data validity of data read from a memory device of the data storage device to a host device, a controller of the data storage device may calculate a cyclic redundancy code (CRC) signature of the decoded data and compare the CRC signature of the decoded data with a CRC signature of the data. The CRC signature of the data is generated during a write operation of the data to the memory device. Rather than returning an uncorrectable error correction code error (UECC) error to the host device when the CRC signature of the decoded data does not match the CRC signature of the data, the controller executes the read command again. By using a different buffer to store the decoded data, the controller may confirm whether the error stemmed from the read path or the error was not from the read path.

In one embodiment, a data storage device includes a non-volatile memory device, a first volatile memory device, a second volatile memory device, and a controller coupled to the non-volatile memory device, the first volatile memory device, and the second volatile memory device. The controller is configured to receive a read command from a host device, read data from the non-volatile memory device, decode the data read from the non-volatile memory device, store the decoded data in the first volatile memory device, calculate a second cyclic redundancy code (CRC) signature for the stored decoded data, determine that the second CRC signature does not match a first CRC signature of the data, where the first CRC is generated and attached to the data when the data is programmed to the non-volatile memory device, and either re-issue a read command to re-read the data from the non-volatile memory device, where the read command comprises instructions to utilize the second volatile memory device to store the data after being re-decoded, or store the decoded data in the second volatile memory device.

In another embodiment, a data storage device includes a non-volatile memory device, a first volatile memory device, a second volatile memory device, where the first volatile memory device and the second volatile memory device are distinct, and a controller coupled to the non-volatile memory device, the first volatile memory device, and the second volatile memory device. The controller is configured to determine that data read during a read operation has a cyclic redundancy code (CRC) signature that does not match a calculated CRC signature associated with the read operation, where the data associated with the read operation is stored in the first volatile memory, initiate a modified read operation, where the modified read operation utilizes the second volatile memory to store the data associated with the modified read operation, determine whether the CRC signature of the data matches a calculated CRC signature associated with the modified read operation, and return the data associated with the modified read operation to a requester of the data when the CRC signature matches the calculated CRC signature associated with the modified read operation.

In another embodiment, a data storage device includes means for storing non-volatile data, means for storing first volatile data, means for storing second volatile data, and a controller coupled to the means for storing non-volatile data, the means for storing first volatile data, and the means for storing second volatile data. The controller is configured to receive a read command to read data from the means for storing non-volatile data, transfer the data from the means for storing non-volatile data to an error correction code (ECC) engine to be decoded, decode the data, store the decoded data in the means for storing first volatile data, determine that a cyclic redundancy code (CRC) signature of the data does not match a calculated CRC signature of the decoded data, and re-issue the read command as a modified read command, where the modified read command utilizes the means for storing second volatile data instead of the means for storing first volatile data to store the decoded data.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, improving end to end data protection. In order to guarantee data validity of data read from a memory device of the data storage device to a host device, a controller of the data storage device may calculate a cyclic redundancy code (CRC) signature of the decoded data and compare the CRC signature of the decoded data with a CRC signature of the data. The CRC signature of the data is generated during a write operation of the data to the memory device. Rather than returning an uncorrectable error correction code error (UECC) error to the host device when the CRC signature of the decoded data does not match the CRC signature of the data, the controller executes the read command again. By using a different buffer to store the decoded data, the controller may confirm whether the error stemmed from the read path or the error was not from the read path.

Figure 1:
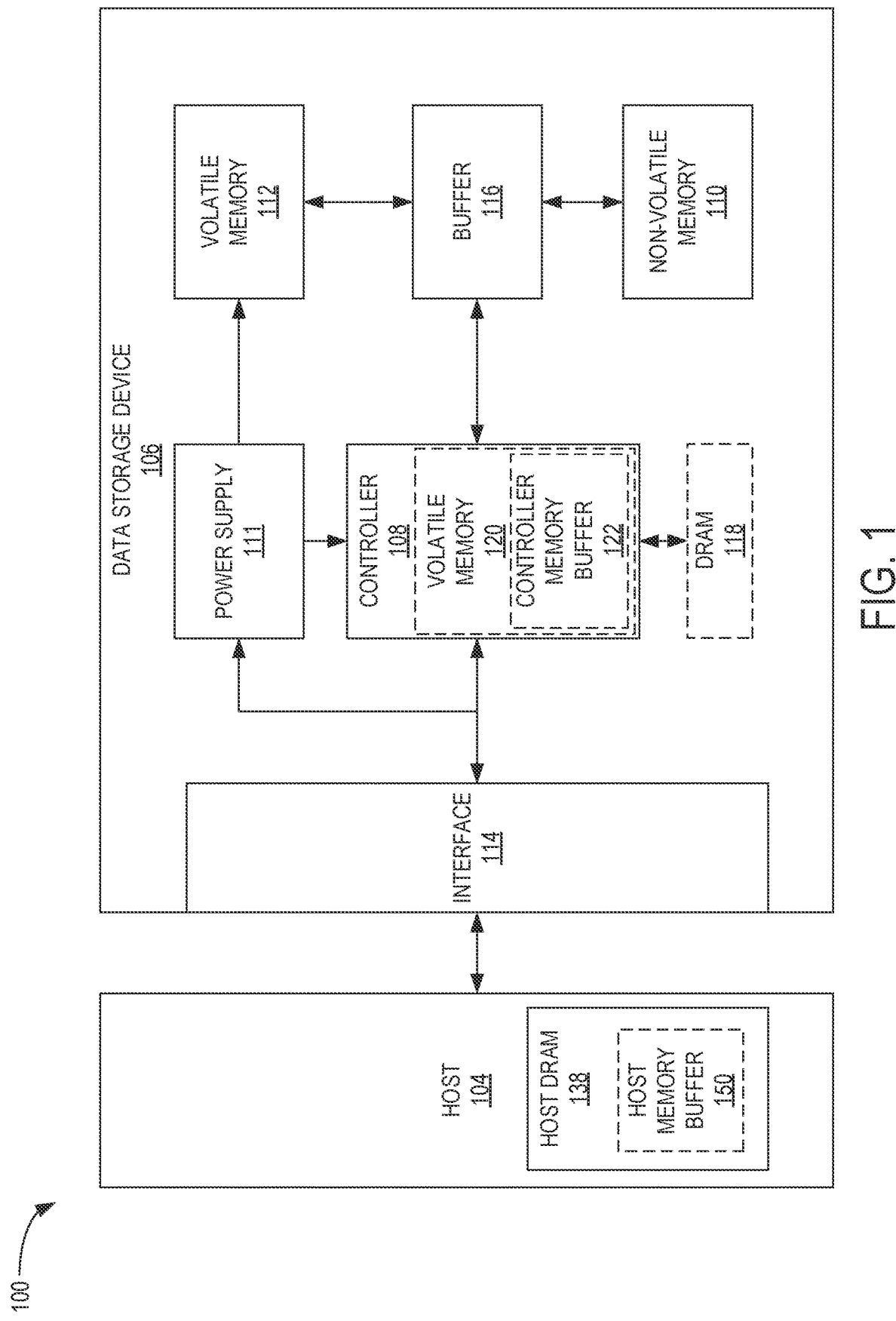
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). It is to be understood in that the listed memory architectures are not intended to be limiting, but to provide examples of possible embodiments. For example, it is contemplated that higher level cell memory may be applicable, such as penta level cell (PLC) memory and the like (e.g., 6-level cell, 7-level cell, etc.). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), synchronous dynamic RAM (SDRAM (e.g., DDR1, DDR2, DDR3, DDR3L, LPDDR3, DDR4, LPDDR4, and the like)), pseudo SRAM (PSRAM) block RAM (BRAM), thyristor RAM (TRAM), accelerator RAM (XRAM), and the like. Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory 120 to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data. It is to be understood that both or either the controller 108 and the data storage device may have other volatile memories other than the volatile memory 112 and the optional second volatile memory 120.

Figure 2:
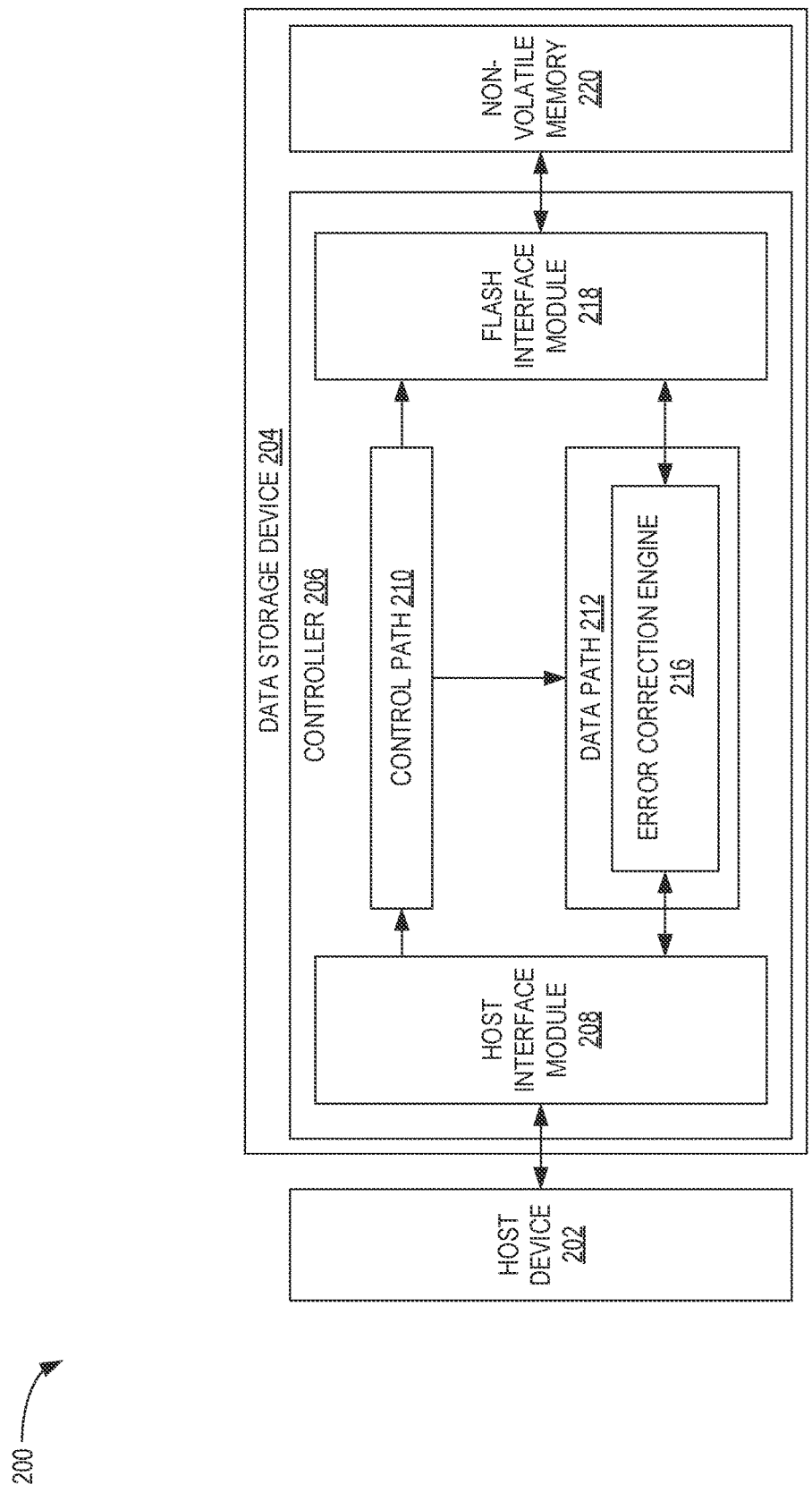
FIG. 2 is a schematic block diagram illustrating a storage system in which a data storage device may function as a storage device for a host device, according to certain embodiments.

FIG. 2 is a schematic block diagram illustrating a storage system 200 in which a data storage device 204 may function as a storage device for a host device 202, according to certain embodiments. It is to be understood that the storage system 200 may be similar to the storage system 100 of FIG. 1.

The host device 202 is coupled to the data storage device 204. The data storage device includes a controller 206 and an NVM 220. In some examples, the data storage device 204 may include additional components not shown in FIG. 2 for the sake of clarity. The controller 206 includes a host interface module (HIM) 208, which may be coupled to the host device 202, a control path 210 coupled to the HIM 208, a data path 212 coupled to the HIM 208 and the control path 210, and a flash interface module (FIM) 218 coupled to the control path 210, the data path 212, and the NVM 220. Data and commands are transferred from the host device 202 to the data storage device 204 via the HIM 208 and data is transferred from the data storage device 204 to the host device 202 via the HIM 208. The HIM 208 may operate under any applicable protocol, such as PCIe, NVMe, and the like.

When a command and the associated data are received by the controller 206 at the HIM 208, the command is provided to the control path 210 from the HIM 208 and the data is provided to the data path 212 from the HIM 208. The control path 210 may include one or components configured to perform one or more of processing the command, generating additional commands based on the received command, initiating control processes, and the like. The data path 212 includes an error correction code (ECC) engine 216. The ECC engine 216 may be an encoder/decoder unit. The ECC engine 216 may be configured to generate ECC data, attach the generated ECC data to the relevant data, and encode the data, including the attached generated ECC data. Furthermore, the ECC engine 216 may be configured to decode encoded data and check for/correct any errors in the decoded data (which may use methods such as Reed-Solomon error correction, single error correction/double error detection (SECDED) code, and the like). The encoded data is provided to the FIM 218 along with instructions generated from the control path 210. The FIM 218 may be configured to access the NVM 220 in order to read data from the NVM 220 and program data to the NVM 220.

When data is received at the HIM 208, the HIM 208 may be configured to generate a cyclic redundancy code (CRC) signature for the received data, which may be for each 4 KB (i.e., a flash management unit) chunk of data. The CRC signature is then checked prior to encoding the data to be programmed to the NVM 220. Likewise, when the data is read from the NVM 220, the data is decoded by the ECC engine 216. The ECC engine 216 checks the CRC signature of the decoded data against a calculated CRC signature, which may be calculated after decoding the data. When a mismatch occurs (i.e., the CRC signature does not match the calculated CRC signature), the controller 206 returns an uncorrectable error correction code (UECC) error to the host device 202. In other words, a read failure is reported to the host device 202.

Figure 3A:
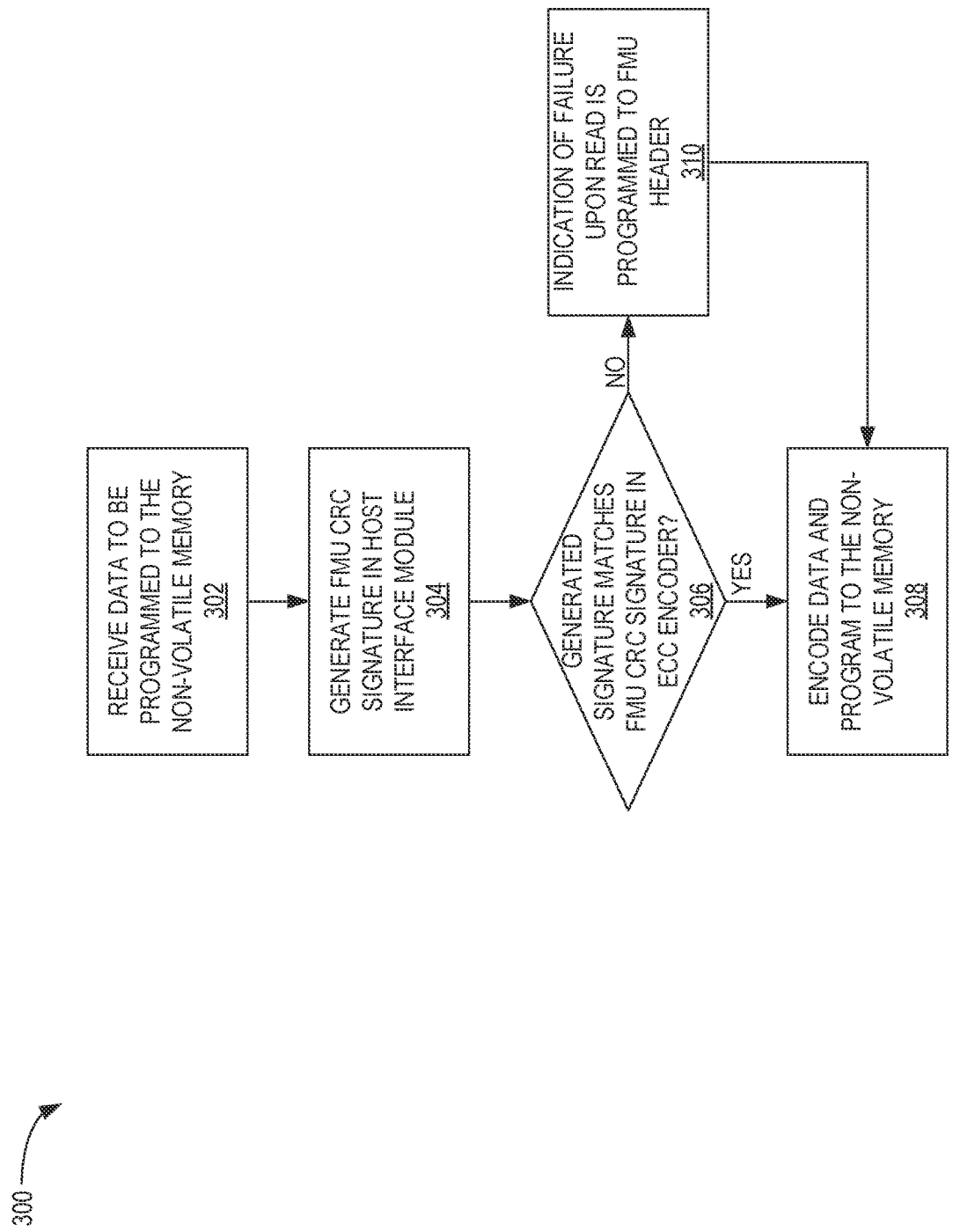
FIG. 3A is a flow diagram illustrating a method of programming data to an NVM of a data storage device, according to certain embodiments.

FIG. 3A is a flow diagram illustrating a method 300 of programming data to an NVM, such as the NVM 110 of FIG. 1 or the NVM 220 of FIG. 2, of a data storage device, such as the data storage device 106 of FIG. 1 or the data storage device 204 of FIG. 2, according to certain embodiments. Method 300 may be implemented by a controller, such as the controller 108 of FIG. 1 or the controller 206 of FIG. 2. For exemplary purposes, aspects of the storage system 100 of FIG. 1 and the storage system 200 of FIG. 2 may be referenced herein.

At block 302, the controller 206 receives data to be programmed to the NVM 220 from the host device 202. At block 304, the HIM 208 generates a CRC signature for each flash management unit (FMU) of the received data. At block 308, the ECC encoder, which may be the ECC engine 216, checks whether the generated CRC signature matches the FMU CRC signature in the ECC encoder. If the generated CRC signature does not match the FMU CRC signature in the ECC encoder at block 306, then an indication of failure upon read is programmed to the FMU header of the data at block 310. However, if the generated CRC signature does match the FMU CRC signature in the ECC encoder at block 306 or after the indication of failure upon read is programmed to the FMU header at block 310, the ECC encoder encodes the data and the controller 206 programs the data to the NVM 220.

Figure 3B:
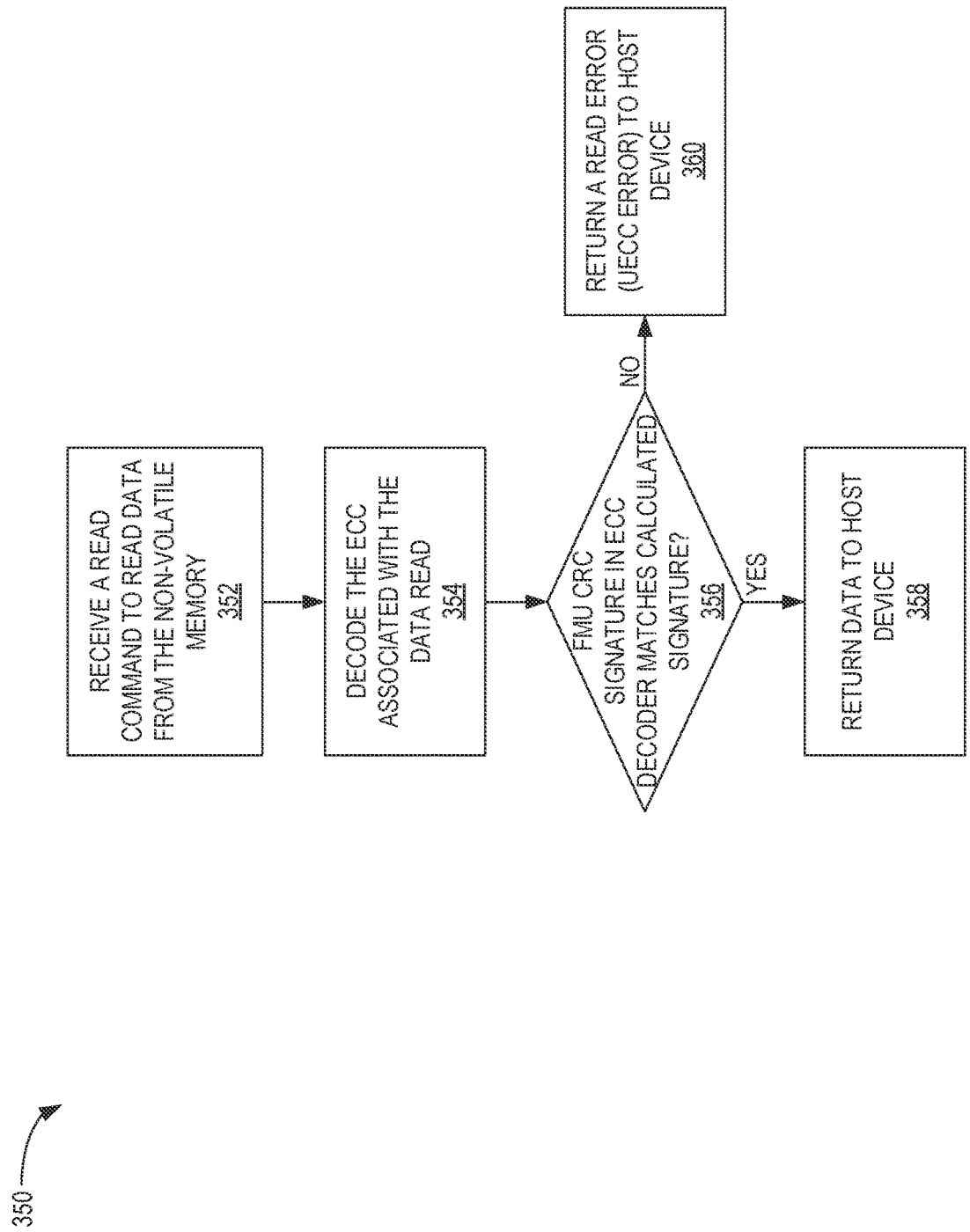
FIG. 3B is a flow diagram illustrating a method of reading data from an NVM of a data storage device, according to certain embodiments.

FIG. 3B is a flow diagram illustrating a method 350 of reading data from an NVM, such as the NVM 110 of FIG. 1 or the NVM 220 of FIG. 2, of a data storage device, such as the data storage device 106 of FIG. 1 or the data storage device 204 of FIG. 2, according to certain embodiments. Method 350 may be implemented by a controller, such as the controller 108 of FIG. 1 or the controller 206 of FIG. 2. For exemplary purposes, aspects of the storage system 100 of FIG. 1 and the storage system 200 of FIG. 2 may be referenced herein.

At block 352, the controller 206 receives a read command to read data from the NVM 220. At block 354, the relevant data, including the ECC, is decoded by an ECC decoder, which may be the ECC engine 216. At block 356, the HIM 208 determines whether the FMU CRC signature in the ECC decoder matches the calculated CRC signature of the data. In other words, the HIM 208 determines if the CRC signature stored with the data matches a CRC signature calculated after decoding the data. If the CRC signatures do not match at block 356, then the controller 206 returns an UECC error to the host device 202 at block 360. However, if the CRC signatures match at block 356, then the decoded data is returned to the host device 202 at block 358.

Figure 4:
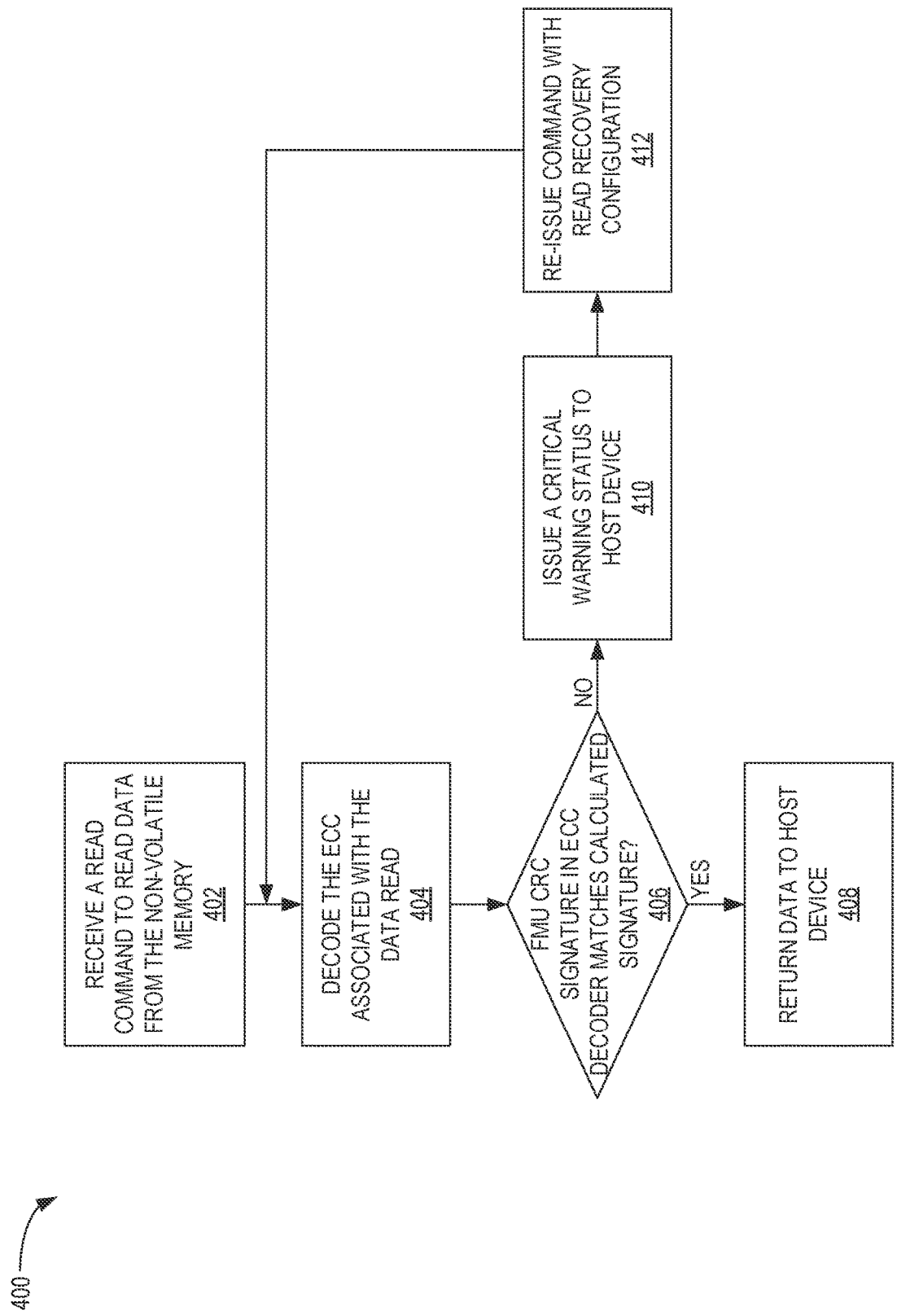
FIG. 4 is a flow diagram illustrating a method of reading data from an NVM of a data storage device, according to certain embodiments.

FIG. 4 is a flow diagram illustrating a method 400 of reading data from an NVM, such as the NVM 110 of FIG. 1 or the NVM 220 of FIG. 2, of a data storage device, such as the data storage device 106 of FIG. 1 or the data storage device 204 of FIG. 2, according to certain embodiments. Method 400 may be implemented by a controller, such as the controller 108 of FIG. 1 or the controller 206 of FIG. 2. For exemplary purposes, aspects of the storage system 100 of FIG. 1 and the storage system 200 of FIG. 2 may be referenced herein.

At block 402, the controller 206 receives a read request from the host device 202 to read data from the NVM 220. At block 404, the ECC engine 216 decodes the ECC associated with the data read from the NVM 220. After decoding the data, the data is buffered in a volatile memory device, such as the optional second volatile memory 120. At block 406, the HIM 208 determines whether the FMU CRC signature in the ECC decoder matches the calculated CRC signature of the data. In other words, the HIM 208 determines if the CRC signature stored with the data matches a CRC signature calculated after decoding the data. If the CRC signatures do not match at block 406, then the controller 206 issues a critical warning status to the host device 202 at block 410. The critical warning status indicates to the host device 202 to either reset the data storage device 204 and re-send the read command or utilize a different volatile memory device in a subsequent re-issued read command because the decoded data may already be corrupted. For example, the volatile memory device utilized may be SRAM and the different volatile memory device utilized may be DRAM, XRAM, BRAM, TRAM, or the like. At block 412, the controller 206 re-issues the read command with a read recovery configuration (i.e., utilizing the different volatile memory device). It is contemplated that the re-reading may occur again (e.g., three or more volatile memory devices existing in the data storage device 204) to another different volatile memory device upon determining that the CRC signatures do not match after extracting the data to the different volatile memory device. However, if the CRC signatures match at block 406, then the decoded data is returned to the host device 202 at block 408.

Figure 5:
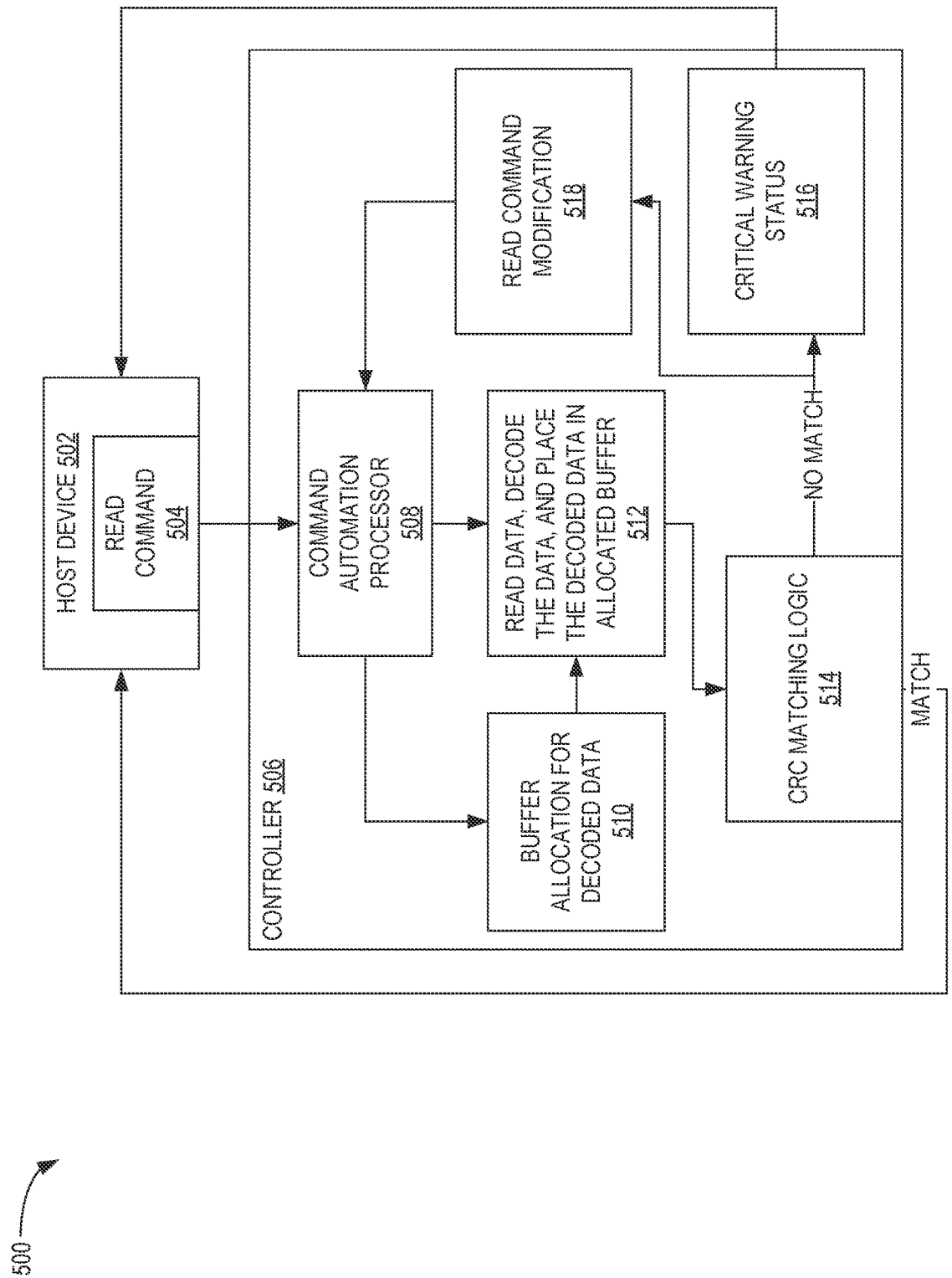
FIG. 5 is a schematic block diagram illustrating a storage system in which a controller is configured to allocate a different volatile memory buffer for a re-issued read command, according to certain embodiments.

FIG. 5 is a schematic block diagram illustrating a storage system 500 in which a controller 506 is configured to allocate a different volatile memory buffer for a re-issued read command, according to certain embodiments. For exemplary purposes, aspects of the storage system 100 of FIG. 1 and the storage system 200 of FIG. 2 may be referenced herein.

The controller 506 includes a command automation processor (CAP) 508 configured to accommodate an option to specify a different volatile memory device allocation for a current read command. For example, if the current read command has returned an UECC error, then, on a subsequent re-issue of the same read command, the CAP 508 may be configured to allocate the different volatile memory device for the re-issued read command, where the different volatile memory device is distinct from the volatile memory device utilized for the current read command.

The host device 502 generates a read command 504 and sends the read command to the controller 506. In some examples, the controller 506 may fetch the read command 504 from the host device 502. The read command 504 is provided to the CAP 508, where the CAP 508 allocates a respective volatile memory device for the decoded data associated with the read command 504 at block 510. If the read command is an original read command (i.e., not a re-issued read command), then the CAP 508 allocates a primary volatile memory device (e.g., SRAM) normally used to store the decoded data at block 510. Otherwise, if the read command is not an original read command (i.e., a re-issued read command), then the CAP 508 allocates a secondary volatile memory device (e.g., DRAM, XRAM, TRAM, BRAM, and the like) to store the decoded data at block 510. At block 512, the controller 506 reads the data from the NVM 220, decodes the data read from the NVM 220, and places the decoded data in the allocated buffer allocated at block 510. At block 514, the CRC matching logic of the controller 506 determines whether the CRC signature of the data matches a calculated CRC signature of the decoded data. If the CRC signatures match, then the data is provided back to the host device 502. However, if the CRC signatures do not match, then the controller 506 is configured to issue the critical warning status at block 516 to the host device 502 and/or modify the read command to use the secondary volatile memory device at block 518.

Figure 6:
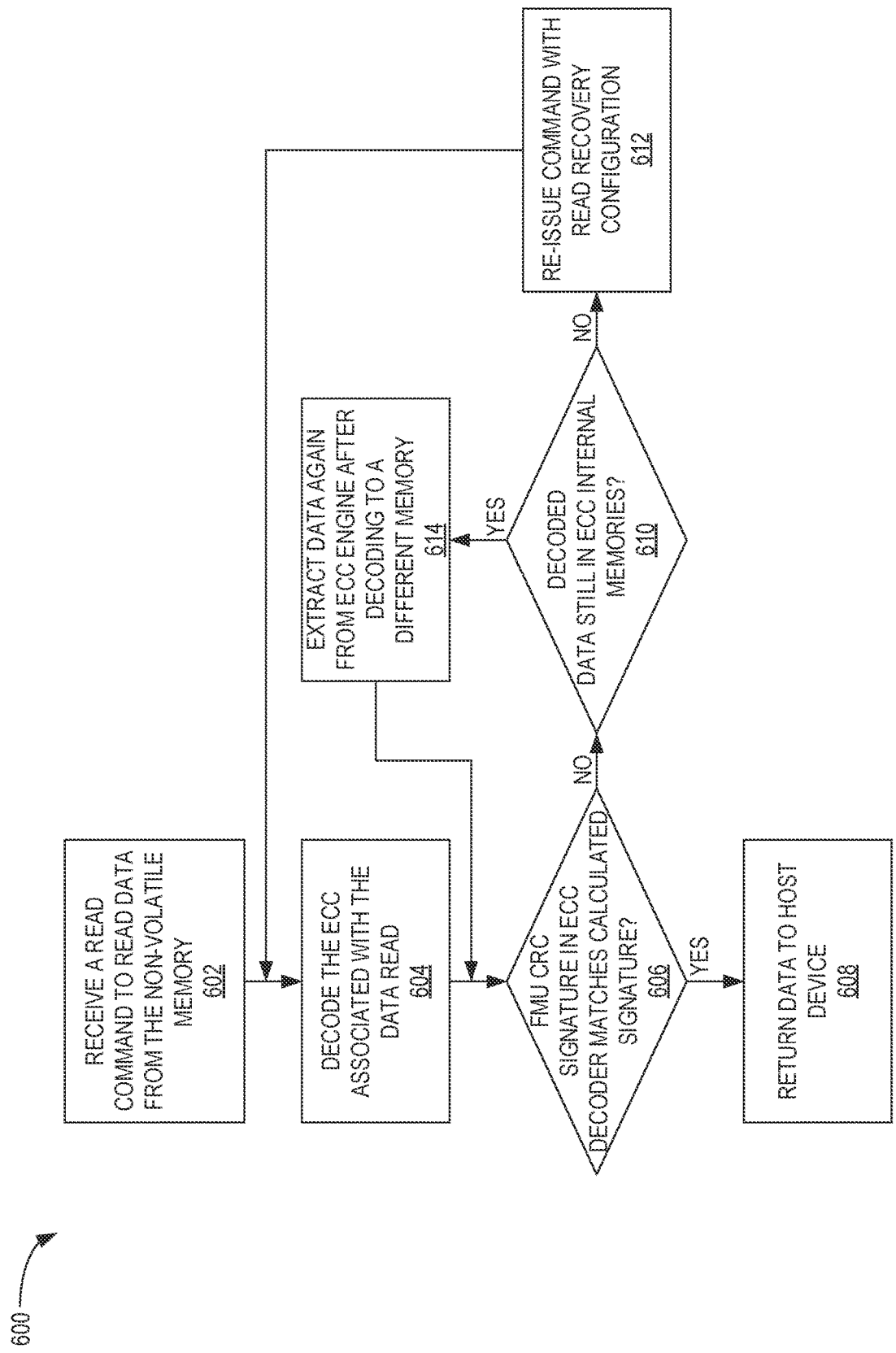
FIG. 6 is a flow diagram illustrating a method of reading data from an NVM of a data storage device, according to certain embodiments.

FIG. 6 is a flow diagram illustrating a method 600 of reading data from an NVM, such as the NVM 110 of FIG. 1 or the NVM 220 of FIG. 2, of a data storage device, such as the data storage device 106 of FIG. 1 or the data storage device 204 of FIG. 2, according to certain embodiments. Method 600 may be implemented by a controller, such as the controller 108 of FIG. 1 or the controller 206 of FIG. 2. For exemplary purposes, aspects of the storage system 100 of FIG. 1, the storage system 200 of FIG. 2, and/or the storage system 500 of FIG. 5, may be referenced herein.

At block 602, the controller 206 receives a read request from the host device 202 to read data from the NVM 220. At block 604, the ECC engine 216 decodes the ECC associated with the data read from the NVM 220. After decoding the data, the data is buffered in a volatile memory device, such as the optional second volatile memory 120. At block 606, the HIM 208 determines whether the FMU CRC signature in the ECC decoder matches the calculated CRC signature of the data. In other words, the HIM 208 determines if the CRC signature stored with the data matches a CRC signature calculated after decoding the data. If the CRC signatures do not match at block 606, then the controller 206 determines if the decoded data is still in the internal memory of the ECC engine 216 at block 610. The ECC engine 216 may include an amount of volatile memory sufficient to store data being decoded/encoded.

If the decoded data is still in the internal memory of the ECC engine 216, then the decoded data may be extracted again from the ECC engine 216 to a different volatile memory device distinct from the original volatile memory device at block 614. For example, the original volatile memory device utilized may be SRAM and the different volatile memory device utilized may be DRAM, XRAM, BRAM, TRAM, or the like. It is contemplated that the extracting may occur again (e.g., three or more volatile memory devices existing in the data storage device 204) to another different volatile memory device upon determining that the CRC signatures do not match after extracting the data to the different volatile memory device. After extracting the data again from the ECC engine 216 to the different volatile memory device, the HIM 208 determines whether the FMU CRC signature in the ECC decoder matches the calculated CRC signature of the data stored in the different volatile memory at block 606. If the decoded data is not in the internal memory of the ECC engine at block 610, then the controller 206 re-issues the command with a read recovery configuration (i.e., utilizing the different volatile memory device) at 612. It is to be understood that if the CRC signature of the data stored in the different volatile memory does not match the CRC signature of the decoded data (generated by the ECC encoder of the ECC engine 216 when the data is encoded), then the controller 206 may report an UECC error to the host device 202. If the CRC signatures match at block 606, then the data is returned to the host device 202 at 608.

By utilizing a different buffer to store decoded data read from a memory device of a data storage device in response to the CRC signature of the decoded data not matching the CRC signature of the data, errors accumulate due to the read path may be avoided, thus, reducing read failures of the data storage device.

In one embodiment, a data storage device includes a non-volatile memory device, a first volatile memory device, a second volatile memory device, and a controller coupled to the non-volatile memory device, the first volatile memory device, and the second volatile memory device. The controller is configured to receive a read command from a host device, read data from the non-volatile memory device, decode the data read from the non-volatile memory device, store the decoded data in the first volatile memory device, calculate a second cyclic redundancy code (CRC) signature for the stored decoded data, determine that the second CRC signature does not match a first CRC signature of the data, where the first CRC is generated and attached to the data when the data is programmed to the non-volatile memory device, and either re-issue a read command to re-read the data from the non-volatile memory device, where the read command comprises instructions to utilize the second volatile memory device to store the data after being re-decoded, or store the decoded data in the second volatile memory device.

The first volatile memory device is distinct from the second volatile memory device. The controller is further configured to issue a critical warning status to the host device responsive to determining that the second CRC signature does not match the first CRC signature. The critical warning status indicates to the host device to either reset the data storage device or utilize the second volatile memory device in the re-issued read command. The controller is further configured to return the decoded data to the host device when the second CRC signature matches the first CRC signature of the data. The controller is further configured to, responsive to re-issuing the read command, re-read the data from the memory device, re-decode the data re-read from the memory device, store the re-decoded data in the second volatile memory device, calculate a third CRC signature for the stored re-decoded data, and determine whether the third CRC signature matches the first CRC signature of the data. The controller is further configured to return the re-decoded data to the host device responsive to determining that the third CRC signature matches the first CRC signature of the data. The controller is further configured to return an uncorrectable error correction code (UECC) error to the host device responsive to determining that the third CRC signature does not match the first CRC signature of the data. The controller is further configured to, responsive to storing the decoded data in the second volatile memory device, calculate a third CRC signature for the decoded data stored in the second volatile memory device and determine whether the third CRC signature matches the first CRC signature of the data. The controller is further configured to return the decoded data from the second volatile memory device to the host device responsive to determining that the third CRC signature matches the first CRC signature of the data. The controller is further configured to return an uncorrectable error correction code (UECC) error to the host device responsive to determining that the third CRC signature does not match the first CRC signature of the data.

In another embodiment, a data storage device includes a non-volatile memory device, a first volatile memory device, a second volatile memory device, where the first volatile memory device and the second volatile memory device are distinct, and a controller coupled to the non-volatile memory device, the first volatile memory device, and the second volatile memory device. The controller is configured to determine that data read during a read operation has a cyclic redundancy code (CRC) signature that does not match a calculated CRC signature associated with the read operation, where the data associated with the read operation is stored in the first volatile memory, initiate a modified read operation, where the modified read operation utilizes the second volatile memory to store the data associated with the modified read operation, determine whether the CRC signature of the data matches a calculated CRC signature associated with the modified read operation, and return the data associated with the modified read operation to a requester of the data when the CRC signature matches the calculated CRC signature associated with the modified read operation.

The read operation includes transferring the data from an internal memory of an error correction code (ECC) engine, utilized to decode the data, to the first volatile memory device. The modified read operation includes transferring the data from the internal memory of the ECC engine, utilized to decode the data, to the second volatile memory device. Transferring the data from the internal memory of the ECC engine, utilized to decode the data, to the second volatile memory device is responsive to determining that the data exists in the ECC engine. Responsive to determining the data does not exist in the ECC engine, the modified read operation includes re-reading the data from the memory device, decoding the data using the ECC engine, and transferring the data to the second volatile memory device. Responsive to determining that the CRC signature of the data does not match the calculated CRC signature associated with the read operation, the controller is further configured to issue a critical warning status to the requester, where the critical warning status indicates to the requester to perform either a reset of the data storage device, where the read operation is re-performed upon the reset of the data storage device, or re-issue a command corresponding with the modified read operation. The controller is further configured to, when the CRC signature of the data does not match the calculated CRC signature associated with the read operation, not send an uncorrectable error correction code (UECC) error to the requester. The controller is further configured to, when the CRC signature of the data does not match the calculated CRC signature associated with the modified read operation, send the UECC error to the requester.

In another embodiment, a data storage device includes means for storing non-volatile data, means for storing first volatile data, means for storing second volatile data, and a controller coupled to the means for storing non-volatile data, the means for storing first volatile data, and the means for storing second volatile data. The controller is configured to receive a read command to read data from the means for storing non-volatile data, transfer the data from the means for storing non-volatile data to an error correction code (ECC) engine to be decoded, decode the data, store the decoded data in the means for storing first volatile data, determine that a cyclic redundancy code (CRC) signature of the data does not match a calculated CRC signature of the decoded data, and re-issue the read command as a modified read command, where the modified read command utilizes the means for storing second volatile data instead of the means for storing first volatile data to store the decoded data. The controller includes a command automation processor (CAP). The CAP is configured to specify to use the means for storing second volatile data for the modified read command.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
 a non-volatile memory device;

a first volatile memory device;
a second volatile memory device; and
a controller coupled to the memory device, the first volatile memory device, and the second volatile memory device, wherein the controller is configured to:
  receive a read command from a host device;
  read data from the non-volatile memory device;
  transfer the data read from the non-volatile memory device to an error correction code (ECC) engine to be decoded;
  decode the data read from the non-volatile memory device;
  store the decoded data in the first volatile memory device;
  calculate a second cyclic redundancy code (CRC) signature for the stored decoded data;
  determine that the second CRC signature does not match a first CRC signature of the data, wherein the first CRC is generated from the data and attached to the data when the data is programmed to the non-volatile memory device;
  re-issue a read command to re-read the data from the non-volatile memory device if the second CRC signature does not match the first CRC signature of the data, wherein the read command comprises instructions to utilize the second volatile memory device to store the data associated with the re-issued read command after being re-decoded;
  determine that the data read from the non-volatile memory device is still in the ECC engine; and
  transfer the data read from the non-volatile memory device still in the ECC engine from the ECC engine to the second volatile memory device responsive to determining that the data read from the non-volatile memory device is still in the ECC engine.

2. The data storage device of claim 1, wherein the first volatile memory device is distinct from the second volatile memory device.

3. The data storage device of claim 1, wherein the controller is further configured to issue a critical warning status to the host device responsive to determining that the second CRC signature does not match the first CRC signature.

4. The data storage device of claim 3, wherein the critical warning status indicates to the host device to either:
  reset the data storage device; or
  utilize the second volatile memory device in the re-issued read command.

5. The data storage device of claim 1, wherein the controller is further configured to return the decoded data to the host device when the second CRC signature matches the first CRC signature of the data.

6. The data storage device of claim 1, wherein the controller is further configured to, responsive to re-issuing the read command:
  re-read the data from the non-volatile memory device;
  re-decode the data re-read from the non-volatile memory device;
  store the re-decoded data in the second volatile memory device;
  calculate a third CRC signature for the stored re-decoded data; and
  determine whether the third CRC signature matches the first CRC signature of the data.

7. The data storage device of claim 6, wherein the controller is further configured to:
  return the re-decoded data to the host device responsive to determining that the third CRC signature matches the first CRC signature of the data.

8. The data storage device of claim 6, wherein the controller is further configured to:
  return an uncorrectable error correction code (UECC) error to the host device responsive to determining that the third CRC signature does not match the first CRC signature of the data.

9. The data storage device of claim 1, wherein the controller is further configured to, responsive to storing the decoded data in the second volatile memory device:
  calculate a third CRC signature for the decoded data stored in the second volatile memory device; and
  determine whether the third CRC signature matches the first CRC signature of the data.

10. The data storage device of claim 9, wherein the controller is further configured to:
  return the decoded data from the second volatile memory device to the host device responsive to determining that the third CRC signature matches the first CRC signature of the data.

11. The data storage device of claim 9, wherein the controller is further configured to:
  return an uncorrectable error correction code (UECC) error to the host device responsive to determining that the third CRC signature does not match the first CRC signature of the data.

12. A data storage device, comprising:
a non-volatile memory device;
a first volatile memory device;
a second volatile memory device, wherein the first volatile memory device and the second volatile memory device are distinct; and
a controller coupled to the non-volatile memory device, the first volatile memory device, and the second volatile memory device, wherein the controller is configured to:
  determine that data read during a read operation has a cyclic redundancy code (CRC) signature that does not match a calculated CRC signature associated with the read operation, wherein the read operation comprises transferring the data from an internal memory of an error correction code (ECC) engine, utilized to decode the data, to the first volatile memory device;
  initiate a modified read operation, wherein the modified read operation comprises transferring the data from the internal memory of the ECC engine, utilized to decode the data, to the second volatile memory device, and utilizes the second volatile memory to store the data associated with the modified read operation, wherein transferring the data from the internal memory of the ECC engine to the second volatile memory device is responsive to determining that the data exists in the ECC engine;
  determine whether the CRC signature of the data matches a calculated CRC signature associated with the modified read operation; and
  return the data associated with the modified read operation to a requester of the data when the CRC signature matches the calculated CRC signature associated with the modified read operation.

13. The data storage device of claim 12, wherein, responsive to determining the data does not exist in the ECC engine, the modified read operation comprises:
  re-reading the data from the memory device;

decoding the data using the ECC engine; and transferring the data to the second volatile memory device.

14. The data storage device of claim 12, wherein, responsive to determining that the CRC signature of the data does not match the calculated CRC signature associated with the read operation, the controller is further configured to:

issue a critical warning status to the requester, wherein the critical warning status indicates to the requester to perform either:

a reset of the data storage device, wherein the read operation is re-performed upon the reset of the data storage device; or re-issue a command corresponding with the modified read operation.

15. The data storage device of claim 12, wherein the controller is further configured to, when the CRC signature of the data does not match the calculated CRC signature associated with the read operation, not send an uncorrectable error correction code (UECC) error to the requester.

16. The data storage device of claim 15, wherein the controller is further configured to, when the CRC signature of the data does not match the calculated CRC signature associated with the modified read operation, send the UECC error to the requester.

17. A data storage device, comprising:

means for storing non-volatile data;

means for storing first volatile data;

means for storing second volatile data; and a controller coupled to the means for storing non-volatile data, the means for storing first volatile data, and the means for storing second volatile data, wherein the controller is configured to:

receive a read command to read data from the means for storing non-volatile data;

transfer the data from the means for storing non-volatile data to an error correction code (ECC) engine to be decoded;

decode the data;

store the decoded data in the means for storing first volatile data;

determine that a cyclic redundancy code (CRC) signature of the data does not match a calculated CRC signature of the decoded data;

re-issue the read command as a modified read command if the CRC signature of the data does not match the calculated CRC signature of the decoded data, wherein the modified read command stores decoded data associated with the modified read command in the means for storing second volatile data instead of the means for storing first volatile data;

determine that the data is still in the ECC engine; and transfer the data still in the ECC engine from the ECC engine to the means for storing second volatile data responsive to determining that the data is still in the ECC engine.

18. The data storage device of claim 17, wherein the controller comprises a command automation processor (CAP), and wherein the CAP is configured to specify to use the means for storing second volatile data for the modified read command.

* * * * *